Dec. 27, 1960   LEUNG TSOO HING   2,966,276
STOPPERS FOR VACUUM JARS
Filed Dec. 11, 1958   2 Sheets-Sheet 1

Inventor
Leung Tsoo Hing
By
Attorney

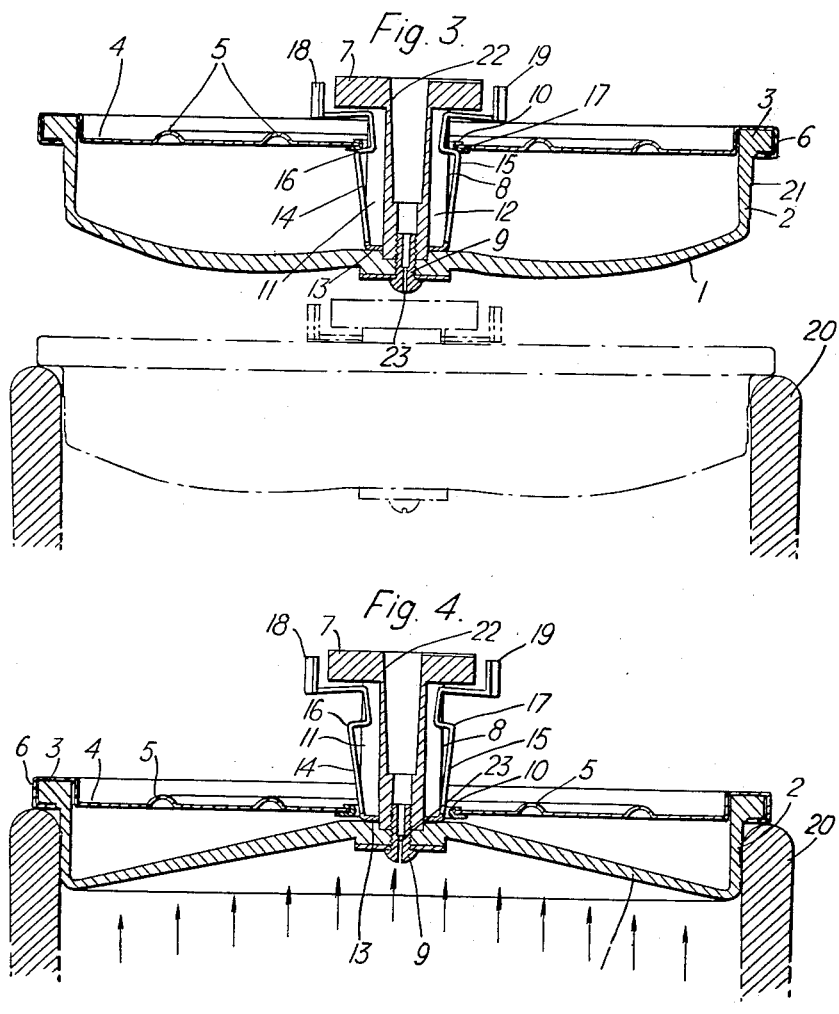

United States Patent Office 2,966,276
Patented Dec. 27, 1960

2,966,276

STOPPERS FOR VACUUM JARS

Leung Tsoo Hing, Camel House, 2–20 Palm St., Kowloon, Hong Kong

Filed Dec. 11, 1958, Ser. No. 779,670

Claims priority, application Great Britain Jan. 1, 1958

5 Claims. (Cl. 215—52)

This invention relates to stoppers for wide-mouthed jars or other containers, for example for vacuum jars such as are commonly used for keeping food hot. Conventional stoppers used in such jars are commonly made of cork or metal with a rubber washer. Cork stoppers are not very satisfactory because they are liable to shrink and so cease to be airtight and they also absorb fluid from the contents of the jars in which they are used and so become rather insanitary. Metal stoppers are usually held in place on the jar by means of a metal strap and apart from being cumbersome and heavy, they are also expensive.

According to the present invention, a stopper for wide-mouthed jars comprises a disc of flexible resilient plastic material with an upstanding peripheral rim from which a shoulder projects outwardly. The stopper is inserted into the jar with the disc innermost until the shoulder engages with the neck of the jar surrounding the mouth. If steam is given off from a hot liquid within the jar, the pressure of the steam acts on the disc and causes it to bulge outwards. This bulging of the disc presses the rim outwards and so causes it to grip the inside of the mouth of the jar more firmly. The stopper is thus prevented from being forced out of the jar. To increase this effect, caused by pressure within the jar, the inner surface of the disc is preferably initially slightly concave.

To facilitate insertion of the stopper into the jar, a cover is provided the periphery of which is supported on the rim and a member extends from the disc through an opening in the cover. By pressing this member inwards, the disc is distorted so that its inner face becomes convex and in so doing pulls the rim inwards, thus reducing its diameter. The member projecting through the cover may be provided with a locking device, so that when it is pressed inwards to reduce the diameter of the rim, it stays locked in this position. After the stopper has been inserted in the jar, the locking device is released to cause the rim to return to its original diameter and fit tightly within the jar.

An example of a stopper constructed in accordance with the invention is illustrated in the accompanying drawings, in which:

Figure 3 is a section on a diameter through the stopper and through a part of the jar into which the stopper is to be inserted showing the stopper distorted in readiness for insertion into a wide-mouthed jar;

Figure 4 is a section similar to Figure 3, but showing the stopper inserted in the mouth of the jar and subjected to pressure within the jar; and Figure 5 is a fragmentary section illustrating the manner in which the stopper grips the jar.

Figure 1:
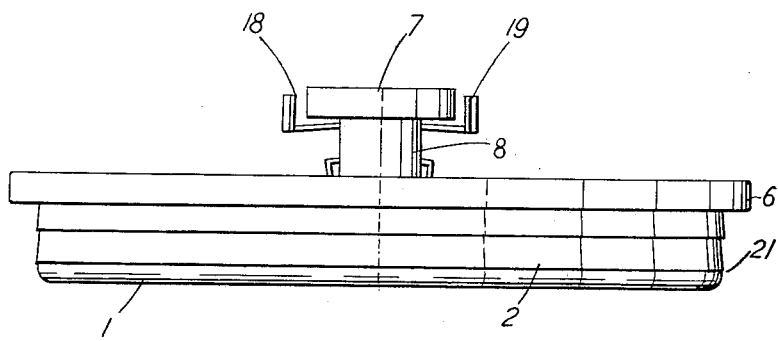
Figure 1 is a side elevation.
Figure 2:
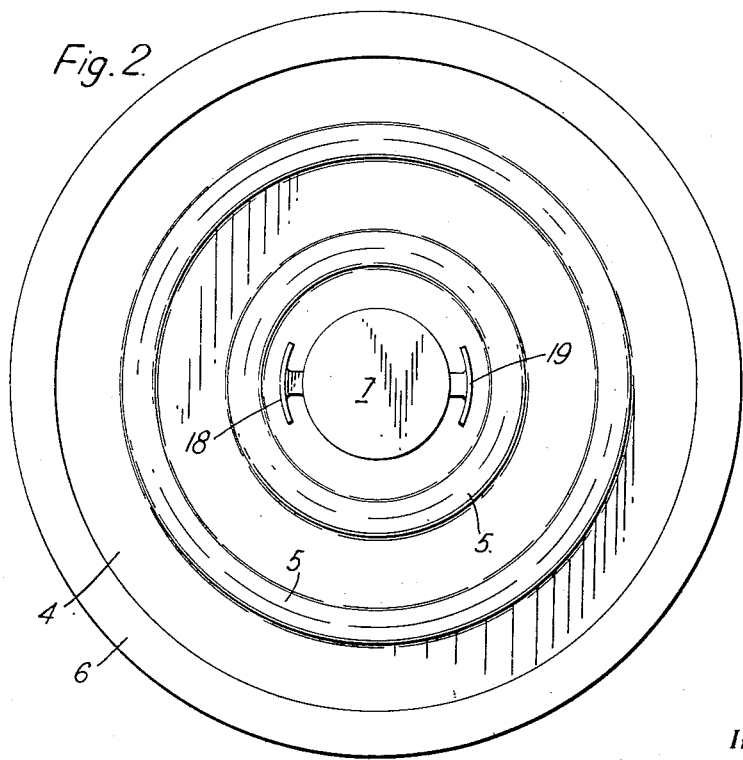
Figure 2 is a plan.

The stopper comprises a disc 1 with a rim 2 and a shoulder 3 which are moulded out of polythene as a single integral piece. The shoulder 3 forms an annular flange projecting around the periphery of the rim 2. A thin sheet metal cover 4 formed with stiffening rings 5 is fixed to the rim 2 by its outer periphery 6 which is bent over the shoulder 3. A hard plastic knob 7 having a shank 8 is fixed to the disc 1 by a screw 9 and extends outwards through a hole 10 in the cover 4. The shank 8 is formed with two diametrically opposite longitudinal grooves 11 and 12. A U-shaped spring 13 has its base clamped between the bottom of the shank 8 and the disc 1 by the screw 9. The spring 13 has side arms 14 and 15 which extend along the grooves 11 and 12 respectively. The arm 14 is formed with a shoulder 16 and the arm 15 has a corresponding shoulder 17. The upper ends of the arms 14 and 15 of the spring 13 are formed with extensions 18 and 19 which lie adjacent the knob 7 and which can be gripped with the fingers to compress the spring 13 and move the shoulders 16 and 17 into the grooves 11 and 12 respectively.

To insert the stopper into a wide-mouthed jar 20, the fingers are placed under the shoulder 3 in approximately diametrically opposite positions and the knob 7 is pressed downwards by the thumbs until the shoulders 16 and 17 engage under the cover 4. When this happens, the knob 7 is locked in position and the disc 1, which was initially concave on its lower face, is held in the distorted form shown in Figure 3. Due to the downward distortion of the disc 1, the outside diameter of the rim 2 is slightly reduced.

With the disc in this distorted condition, the stopper is inserted into the mouth of the jar 20 in the position shown in chain dotted lines in Figure 3. The extensions 18 and 19 are then pressed radially inwards so that the shoulders 16 and 17 are released from engagement with the cover 4. The knob 7 is then moved upwards by the natural resilience of the disc 1 which causes it to return to its initial shape. In so doing, the outside diameter of the rim 2 is slightly increased so that the stopper is firmly wedged within the mouth of the jar 20.

To improve the grip of the rim 2 on the inside of the mouth of the jar 20, the rim is formed with circumferential serrations 21. If the jar 20 is filled with a hot volatile liquid, the pressure within the jar will rise slightly above that of the atmosphere and the disc 1 will be pushed upwards as shown in Figure 4. Were it not for the restraint of the surrounding mouth of the jar 20, the rim 2 would be caused to bulge outwards as shown in detail in Figure 5. This outward bulging is in fact prevented by the surrounding mouth of the jar 20 but the pressure between the rim 2 and the mouth of the jar 20 is increased so that as the pressure in the jar rises, the stopper becomes more firmly wedged in position.

The knob 7 and its shank 8 has an internal bore 22 which is 9/32 inch in diameter decreasing near the bottom to 3/16 inch diameter. The screw 9 has an internal bore 23 of considerably smaller diameter. The diameter of the bore 23 is preferably about 1/50 of an inch. The bores 23 and 22 act as a safety vent to relieve excess pressure within the jar 20. When the jar contains water, steam passing upwards through the bore 23 continues through the bore 22 and in consequence through the top of this bore. Some of the steam is, however, condensed by contact with the surface of the bore 22 and runs back into the bore 23. The condensed steam is held in the bore 23 by capillary action and this bore is thus closed so that the jar becomes completely sealed.

It has been found that this condensation and consequent closure of the bore in the screw occurs when the temperature of water within the vacuum jar falls to about 85° centigrade. At this temperature, the jar, therefore, becomes completely sealed but it will be appreciated that at this temperature also the pressure has fallen to such an extent that it is no longer necessary to vent the jar.

I claim:

1. A stopper for a wide-mouthed jar, said stopper comprising a disc of resilient flexible plastic material, an upwardly extending rim of greater diameter than the mouth of said jar fixed to the periphery of said disc, an annular shoulder projecting outwardly around the top of said rim, a cover fixed to said rim and extending above said disc, a member fixed to said disc and extending through an opening in said cover, whereby pressing of said member inwardly through said cover causes the inner face of said disc to become convex and pulls said rim inwards towards the center of said disc, and detent means operatively positioned between said member and said cover, said detent means releasably locking said member to said cover when said member is moved into its inwardly pressed position to hold said member in said position.

2. A stopper as claimed in claim 1, in which said disc and said member have an opening passing therethrough, said opening acting as a safety vent.

3. A stopper as claimed in claim 2, in which at least part of said opening is of sufficiently small cross-section to retain condensed steam within it by capillary action whereby said opening is closed.

4. A stopper for a wide-mouthed jar, said stopper comprising a disc, an upwardly extending rim fixed to the periphery of said disc, an annular shoulder projecting outwardly around the top of said rim of greater diameter than the mouth of said jar, said disc, rim and shoulder being a single intgeral piece of polyethylene material, a cover fixed to said rim and extending above said disc, a member fixed to said disc and extending through an opening in said cover, whereby pressing of said member inwardly through said cover causes the inner face of said disc to become convex and pulls said rim inwards towards the center of said disc, and detent means operatively positioned between said member and said cover, said detent means releasably locking said member to said cover when said member is moved into its inwardly pressed position to hold said member in said position.

5. A stopper for a wide-mouthed jar, said stopper comprising a disc of resilient flexible plastic material, an upwardly extending rim fixed to the periphery of said disc, an annular shoulder projecting outwardly around the top of said rim, a cover fixed to said rim and extending above said disc, a member fixed to said disc and extending through an opening in said cover, whereby pressing of said member inwardly through said cover causes the inner face of said disc to become convex and pulls said rim inwards towards the center of said disc, and means for releasably locking said member to said cover to hold said member in its inwardly pressed position which comprises a U-shaped spring, said spring comprising two side arms extending along opposite sides of said member and through said opening in said cover, and a base portion, a shoulder on each of said side arms and means for fixing said base portion to said member, the shoulders being engageable under said cover when said member is pressed inwardly through said cover and being disengageable from said cover to release said member by pressing said two side arms towards said member.

References Cited in the file of this patent

UNITED STATES PATENTS

| | | |
|---|---|---|
| 2,214,732 | Kraft | Sept. 17, 1940 |
| 2,672,999 | Protasoff | Mar. 23, 1954 |
| 2,685,380 | Moeller | Aug. 3, 1954 |